United States Patent
Kitajima et al.

(10) Patent No.: US 12,164,798 B2
(45) Date of Patent: Dec. 10, 2024

(54) MEMORY SYSTEM THAT MANAGES WEAR-OUT INFORMATION OF ITS NON-VOLATILE MEMORY ACCORDING TO AN OPERATION MODE OF THE NON-VOLATILE MEMORY AND METHOD OF OPERATING THE MEMORY SYSTEM

(71) Applicant: KIOXIA CORPORATION, Tokyo (JP)

(72) Inventors: Ryuichi Kitajima, Chiba (JP); Masahiko Nakashima, Kanagawa (JP); Syu Nakanishi, Kanagawa (JP)

(73) Assignee: Kioxia Corporation, Tokyo (JP)

( * ) Notice: Subject to any disclaimer, the term of this patent is extended or adjusted under 35 U.S.C. 154(b) by 121 days.

(21) Appl. No.: 17/898,791

(22) Filed: Aug. 30, 2022

(65) Prior Publication Data

US 2023/0325109 A1 Oct. 12, 2023

(30) Foreign Application Priority Data

Mar. 24, 2022 (JP) .................................. 2022-047669

(51) Int. Cl.
*G06F 3/06* (2006.01)
(52) U.S. Cl.
CPC .......... *G06F 3/0655* (2013.01); *G06F 3/0604* (2013.01); *G06F 3/0679* (2013.01)

(58) Field of Classification Search
CPC .... G06F 3/0655; G06F 3/0604; G06F 3/0679; G06F 3/061; G06F 3/0634
See application file for complete search history.

(56) References Cited

U.S. PATENT DOCUMENTS

| | | | |
|---|---|---|---|
| 8,355,280 B2 | 1/2013 | Yoon et al. | |
| 2014/0304451 A1* | 10/2014 | Shibayama | G06F 12/0246 711/103 |
| 2017/0046272 A1* | 2/2017 | Farmahini-Farahani | G06F 12/1408 |
| 2019/0138227 A1* | 5/2019 | Yamamoto | G06F 3/064 |
| 2020/0310646 A1* | 10/2020 | Song | G11C 11/5628 |
| 2021/0011642 A1 | 1/2021 | Lee | |
| 2022/0230681 A1* | 7/2022 | Khwa | G11C 11/5678 |

FOREIGN PATENT DOCUMENTS

| | | | | |
|---|---|---|---|---|
| JP | 2010198407 A | | 9/2010 | |
| JP | 5660615 B2 | | 1/2015 | |
| JP | 2018120439 A | * | 8/2018 | ......... G06F 12/0246 |

* cited by examiner

*Primary Examiner* — Michael Krofcheck
(74) *Attorney, Agent, or Firm* — Kim & Stewart LLP (57) ABSTRACT

A memory system includes a first non-volatile memory and a control circuit. The first non-volatile memory operates in one of a plurality of operation modes including at least a first operation mode and a second operation mode. The control circuit switches the operation mode of the first non-volatile memory based on an operation mode switching information received from an external device.

17 Claims, 11 Drawing Sheets

| ADDRESS | | DATA | |
|---|---|---|---|
| 0x0000 | OPERATION MODE | 0x00 | TLC MODE |
| | | 0x01 | SLC MODE |
| 0x0001 | UPDATE FLAG | 0x00 | THERE IS NO UPDATE |
| | | 0x01 | THERE IS UPDATE |

MEMORY SYSTEM THAT MANAGES WEAR-OUT INFORMATION OF ITS NON-VOLATILE MEMORY ACCORDING TO AN OPERATION MODE OF THE NON-VOLATILE MEMORY AND METHOD OF OPERATING THE MEMORY SYSTEM

CROSS-REFERENCE TO RELATED APPLICATION (S)

This application is based upon and claims the benefit of priority from Japanese Patent Application No. 2022-047669 filed Mar. 24, 2022, the entire contents of which are incorporated herein by reference.

FIELD

Embodiments described herein relate generally to a memory system and a method of operating the memory system.

BACKGROUND

A memory system including a non-volatile memory as a semiconductor storage device and a control circuit for controlling the semiconductor storage device is known.

DETAILED DESCRIPTION

Embodiments provide a memory system including a semiconductor storage device capable of improving durability and a method of operating the memory system.

In general, according to one embodiment, the memory system includes a first non-volatile memory and a control circuit. The first non-volatile memory operates in any one of a plurality of operation modes including at least a first operation mode and a second operation mode. The control circuit switches the operation mode of the first non-volatile memory based on an operation mode switching information received from an external device.

According to an embodiment of the present disclosure, a method of operating a memory system is provided. The memory system includes a first non-volatile memory that operates in any one of a plurality of operation modes including at least a first operation mode and a second operation mode. Operation mode switching information is received from the external device, and the operation mode of the first non-volatile memory is switched based on the operation mode switching information.

Hereinafter, embodiments for implementing the disclosure will be described with reference to the accompanying drawings. The drawings are schematic, and for example, a relationship between the thickness and the plane dimensions, the ratio of the thickness of each layer, and the like may differ from the actual ones. Further, in the embodiments, substantially the same components are designated by the same reference numerals, and the descriptions thereof will be omitted.

First Embodiment

A memory system according to a first embodiment will be described with reference to FIGS. 1 to 8.
(Configuration)

Figure 1:
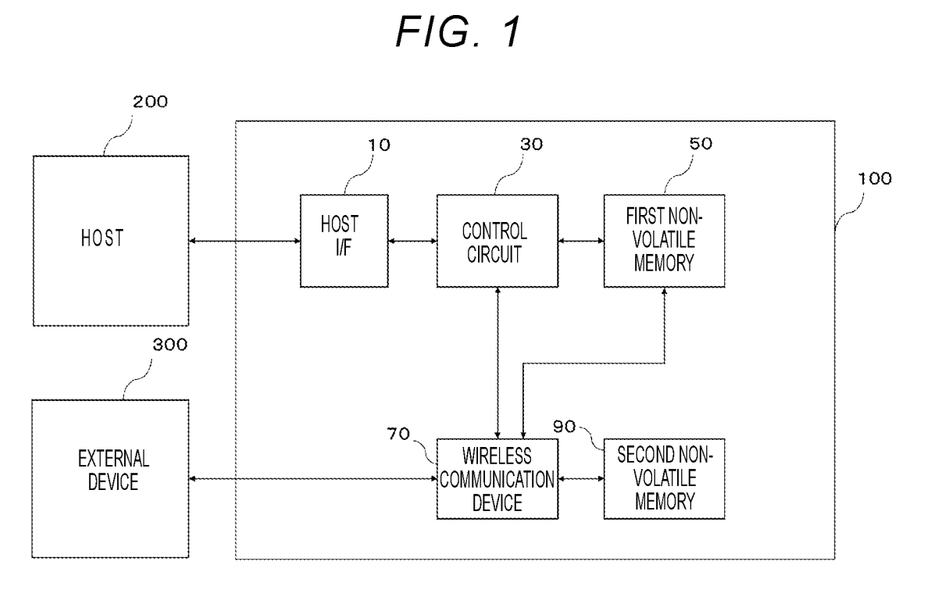
FIG. 1 is a block diagram illustrating an example of the configuration of a memory system according to a first embodiment.

FIG. 1 is a block diagram illustrating an example of the configuration of the memory system according to the first embodiment.

As illustrated in FIG. 1, the memory system 100 includes a host interface (hereinafter, simply referred to as a host I/F) 10, a control circuit 30, a first non-volatile memory 50, a wireless communication device 70, and a second non-volatile memory 90. In the present embodiment, the memory system 100 is, for example, an SD® card.

The host I/F 10 controls communication between the memory system 100 and a host 200. The host I/F 10 controls the transfer of data, commands, and addresses between the memory system 100 and the host 200.

The control circuit 30 is, for example, a central processing unit (CPU). The control circuit 30 may control the entire operation of the memory system 100.

The first non-volatile memory 50 is a semiconductor memory device. The first non-volatile memory 50 is, for example, a NAND-type flash memory.

The first non-volatile memory 50 has a plurality of blocks including a plurality of storage elements. Each of the storage elements stores data in a non-volatile manner. The first non-volatile memory 50 stores, for example, user data and system data. The user data is data that may be accessed by a user via the host 200. The user may perform an operation on the user data. The operation includes, for example, a write operation, a read operation, or an erase operation. The system data is, for example, data necessary for the memory system 100 to operate. The system data includes, for example, control software and firmware of the memory system 100, a memory management table, a wear-out information table, and an operation mode currently applied.

The memory management table stores, for example, IDs of blocks among a plurality of blocks capable of performing an operation. In the pre-shipment test of the memory system 100, a block whose write operation is not completed within the requested time is excluded from the memory management table at the time of shipment as a defective block. When a block is excluded from the memory management table, its ID is not stored in the memory management table.

The wear-out information table stores, for example, a wear-out degree of each of the plurality of blocks. In the wear-out information table, a block having a wear-out degree equal to or greater than a first wear-out degree is excluded from the memory management table as a defective block. The wear-out degree is related to, for example, the number of write operations and the operation mode described later. As the number of write operations becomes larger, the wear-out degree becomes greater.

The wireless communication device 70 may be connected to an external device 300. In the present embodiment, the external device 300 is connected to the memory system 100 via a network. The external device 300 and the memory system 100 are connected by using, for example, near field communication (NFC), which is an example of a short-range wireless communication. In the present embodiment, the external device 300 is, for example, a mobile phone capable of communicating with the wireless communication device 70.

The wireless communication device 70 is connected to the control circuit 30, the first non-volatile memory 50, and the second non-volatile memory 90. The wireless communication device 70 receives the operation mode switching information of the first non-volatile memory 50 from the external device 300. The operation mode switching information received from the external device 300 by the wireless communication device 70 is stored in the second non-volatile memory 90.

In the present embodiment, the wireless communication device 70 has been described to be connected to the external device 300 by using the NFC, but may be a Bluetooth® as long as the wireless communication device 70 conforms to a short-range wireless communication standard. Further, the wireless communication device 70 may conform to the wireless local area network (LAN)-related standard such as Wi-Fi®.

The second non-volatile memory 90 is connected to the wireless communication device 70. The second non-volatile memory 90 is, for example, an electrically erasable programmable read-only memory (EEPROM). The second non-volatile memory 90 stores the operation mode switching information. In the present embodiment, the external device 300 and the wireless communication device 70 are connected by the NFC. Therefore, even when a power is not supplied to the memory system 100, the external device 300 may perform an operation on the second non-volatile memory 90 via the wireless communication device 70. The control circuit 30 switches the operation mode of the first non-volatile memory 50 based on the operation mode switching information stored in the second non-volatile memory 90.

Figure 2:
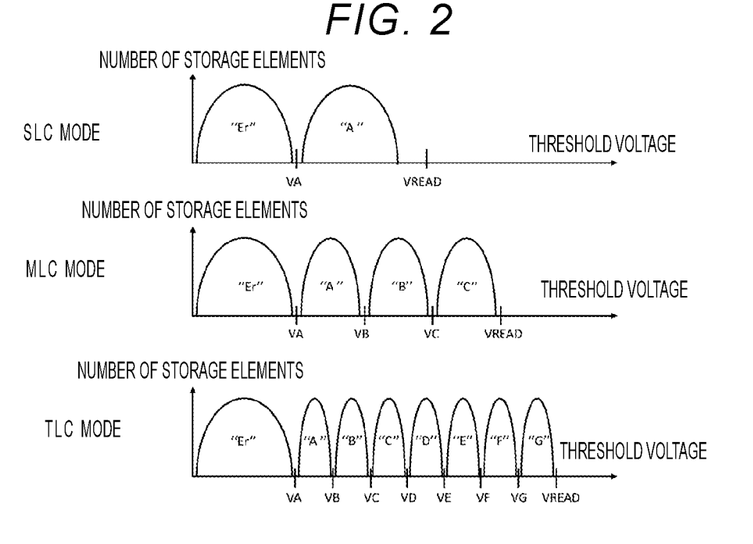
FIG. 2 is a schematic diagram illustrating operation modes of a first non-volatile memory according to the first embodiment.

FIG. 2 is a schematic diagram illustrating operation modes of the first non-volatile memory according to the first embodiment. The first non-volatile memory 50 may apply several operation modes. In the present embodiment, the first non-volatile memory 50 operates in one of several operation modes.

FIG. 2 illustrates the threshold voltage distributions of the SLC mode, the MLC mode, and the TLC mode as an example of several operation modes. In the threshold voltage distribution, the vertical axis corresponds to the number of storage elements, and the horizontal axis corresponds to the threshold voltages Vth of the storage elements. As illustrated in FIG. 2, a plurality of storage elements forms a plurality of threshold voltage distributions according to the applied operation mode.

The single-level cell (SLC) mode is an operation mode for storing 1-bit data for one storage element. When the SLC mode is applied, the threshold voltage forms two threshold voltage distributions. The two threshold voltage distributions are referred to as the "Er" state and "A" state, respectively, in order from, for example, the lowest threshold voltage. In the SLC mode, different values of 1-bit data are assigned to the threshold voltage distributions in the "Er" state and the "A" state, respectively.

The multi-level cell (MLC) mode is an operation mode for storing 2-bit data for one storage element. When the MLC mode is applied, the threshold voltage forms four threshold voltage distributions. The four threshold voltage distributions are referred to as the "Er" state, "A" state, "B" state, and "C" state, respectively, in order from, for example, the lowest threshold voltage. In the MLC method, different values of 2-bit data are assigned to the threshold voltage distributions from the "Er" state to the "C" state, respectively.

The triple-level cell (TLC) mode is an operation mode for storing 3-bit data for one storage element. When the TLC mode is applied, the threshold voltage forms eight threshold voltage distributions. The eight threshold voltage distributions are referred to as the "Er" state, "A" state, "B" state, "C" state, "D" state, "E" state, "F" state, and "G" state, respectively, in order from, for example, the lowest threshold voltage. In the TLC method, different values of 3-bit data are assigned to the threshold voltage distributions from the "Er" state to the "G" state, respectively.

As the number of bits that may be stored in one storage element becomes larger, the storage capacity becomes larger. Meanwhile, the operation mode in which the number of bits that may be stored in one storage element is relatively small has a higher durability. An operation mode in which the number of bits that may be stored in one storage element is relatively large is more likely to be worn out more rapidly than an operation mode in which the number of bits that may be stored in one storage element is relatively small.

In the present embodiment, the SLC mode is an example of a first operation mode. The TLC mode is an example of a second operation mode.

Figure 3:
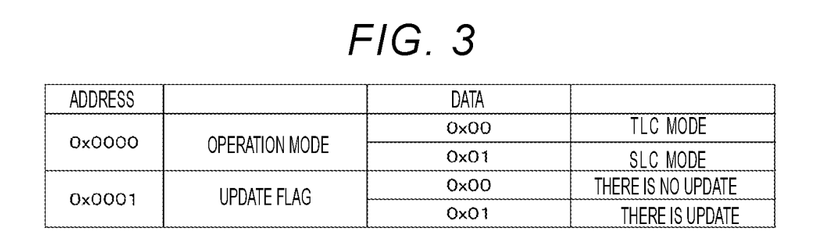
FIG. 3 is a table illustrating operation mode switching information according to the first embodiment.

FIG. 3 is a table illustrating operation mode switching information according to the first embodiment. The operation mode switching information is stored in the second non-volatile memory 90. In the present embodiment, the operation mode switching information includes an update flag and an operation mode.

The update flag indicates whether to change the operation mode of the first non-volatile memory. The update flag is stored, for example, at the address 0x0001 of the second non-volatile memory 90. When the data stored in the address 0x0001 of the second non-volatile memory 90 is 0x01, the first non-volatile memory 50 operates in, for example, an operation mode different from the currently applied operation mode. That is, the operation mode is changed. When the data stored in the address 0x0001 of the second non-volatile memory 90 is 0x00, the first non-volatile memory 50 operates in, for example, the same operation mode as the currently applied operation mode. That is, the operation mode is not changed. In the present embodiment, the data 0x01 stored in the address 0x0001 of the second non-volatile memory 90 is an example of a first value. The data 0x00 stored in the address 0x0001 of the second non-volatile memory 90 is an example of a second value.

The operation mode indicates either the SLC mode or the TLC mode. The operation mode is received from, for example, the external device 300. The operation mode is stored in, for example, the address 0x0000 of the second non-volatile memory 90. When the data stored in the address 0x0000 of the second non-volatile memory 90 is 0x01, the first non-volatile memory 50 operates in, for example, the SLC mode. When the data stored in the address 0x0000 of the second non-volatile memory 90 is 0x00, the first non-volatile memory 50 operates in, for example, the TLC mode. In the present embodiment, the data 0x01 stored in the address 0x0000 of the second non-volatile memory 90 is an example of a third value. The data 0x00 stored in the address 0x0000 of the second non-volatile memory 90 is an example of a fourth value.

(Operation)

Figure 4:
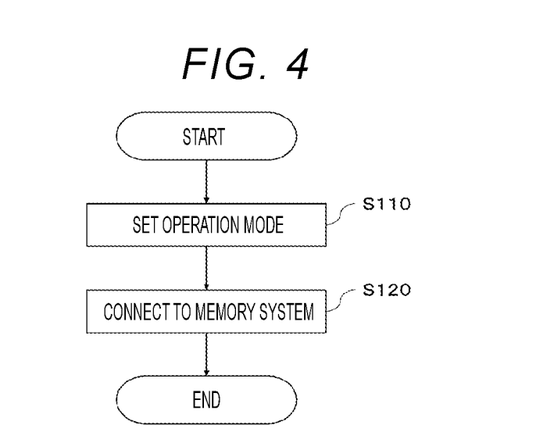
FIG. 4 is a flowchart for setting an operation mode of the memory system according to the first embodiment.

FIG. 4 is a flowchart for setting an operation mode of the memory system according to the first embodiment.

First, the external device 300 sets the operation mode (S110). The external device 300 sets the operation mode using, for example, a dedicated application.

Subsequently, the external device 300 is connected to the memory system 100 (S120). In the present embodiment, when the memory system 100 and the external device 300 are connected to each other, the distance may be close enough to allow the external device 300 and the memory system 100 to be connected. When the external device 300 and the memory system 100 are connected to each other, the operation mode switching information is written into the second non-volatile memory 90 via the wireless communication device 70.

Specifically, when the operation mode set in the external device 300 is the TLC mode, 0x00 is written to the address 0x0000 of the second non-volatile memory 90. When the operation mode set in the external device 300 is the SLC mode, 0x01 is written to the address 0x0000 of the second non-volatile memory 90. Further, when several operation modes are written to the address 0x0000 of the second non-volatile memory 90, 0x01 is written to the address 0x0001 of the second non-volatile memory 90. This completes the setting of the operation mode of the memory system 100.

Figure 5:
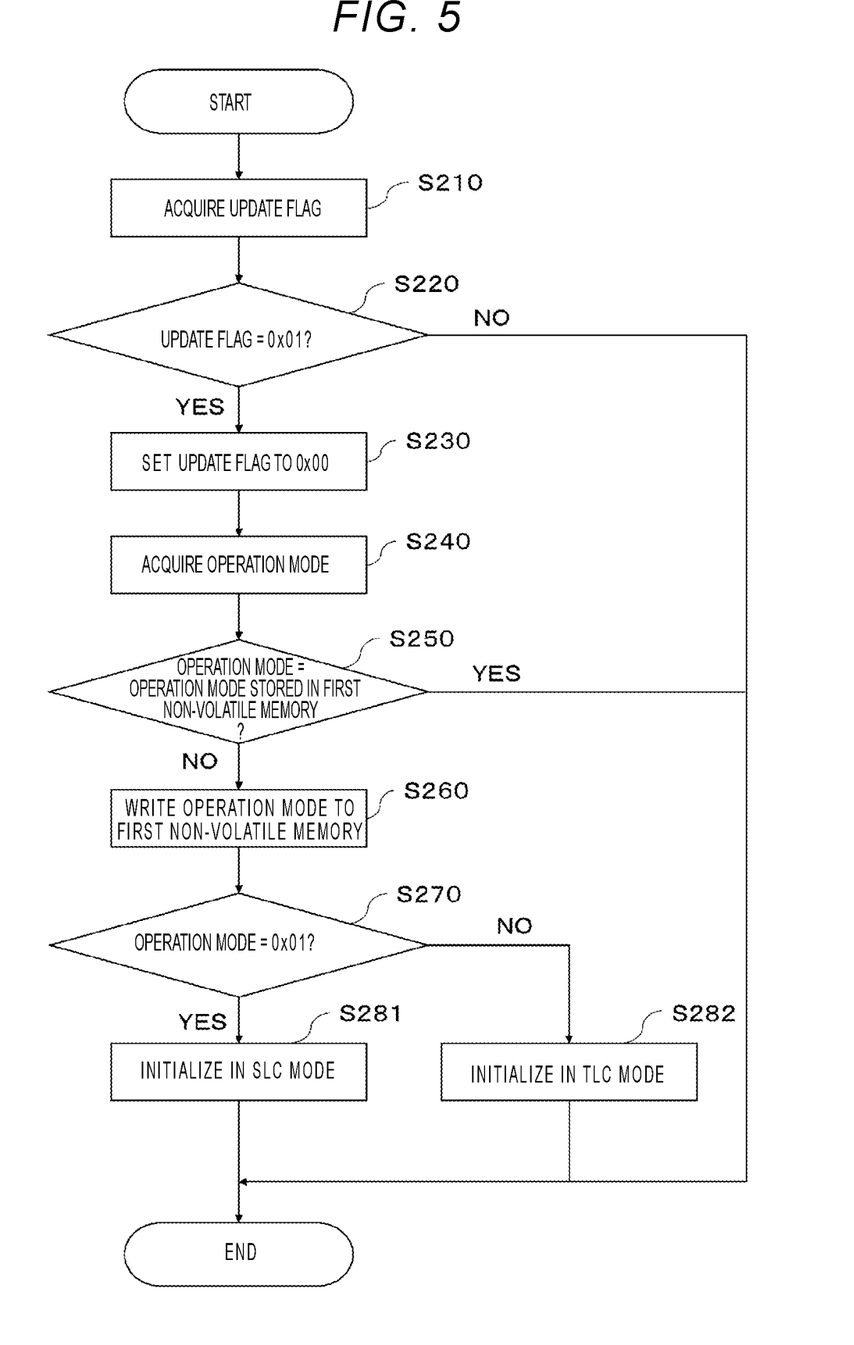
FIG. 5 is a flowchart of an initialization operation of the memory system according to the first embodiment.

FIG. 5 is a flowchart of an initialization operation of the memory system according to the first embodiment. With reference to FIG. 5, descriptions will be made on the initialization operation of the memory system 100 that includes the switching of the operation mode of the memory system 100. In the present embodiment, the initialization operation is to erase all user data stored in the first non-volatile memory 50 and return the blocks storing the user data to a shipping state. In the initialization operation, the system data of the memory system 100 is not erased. Therefore, when erasing the user data, it is necessary to save, for example, the user data to the host 200 in advance.

The memory system 100 is connected to, for example, the host 200 and is supplied with power. In the present embodiment, the memory system 100 is inserted into the SD® card slot of the host 200 to supply power. When the memory system 100 is started up, the control circuit 30 acquires an update flag from the address 0x0001 of the second non-volatile memory 90 (S210).

Subsequently, the control circuit 30 confirms whether the update flag acquired in S210 is 0x01 (S220). When it is confirmed that the update flag is 0x00 ("NO" in S220), the operation mode is not changed because it is the same as the currently applied operation mode. That is, the control circuit 30 does not need to perform the initialization operation. Therefore, the process ends without performing the initialization operation. Meanwhile, when the update flag is 0x01 ("YES" in S220), the control circuit 30 sets the update flag to 0x00 (S230).

The control circuit 30 acquires the operation mode from the address 0x0000 of the second non-volatile memory 90 (S240).

Subsequently, the control circuit 30 confirms whether the operation mode acquired in S240 and the operation mode stored as system data in the first non-volatile memory 50 match (S250). When the operation mode acquired in S240 and the operation mode stored in the first non-volatile memory 50 are confirmed to match ("YES" in S250), the process ends without performing the initialization operation. Meanwhile, when the operation mode acquired in S240 and the operation mode stored in the first non-volatile memory 50 are confirmed not to match ("NO" in S250), the operation mode acquired in S240 is written into the first non-volatile memory 50 (S260). As a result, the operation mode stored as system data in the first non-volatile memory 50 is changed.

The control circuit 30 confirms whether the operation mode written in S260 is 0x01 (S270). When it is confirmed that the data of the operation mode written in S260 is 0x01 ("YES" in S270), the control circuit 30 performs the initialization operation of the memory system 100 in the SLC mode (S281). Meanwhile, when it is confirmed that the data of the operation mode written in S260 is 0x00 ("NO" in S270), the control circuit 30 performs the initialization operation of the memory system 100 in the TLC mode (S282).

After performing the initialization operation, the power supplied to the memory system 100 is turned off once, and the power is supplied to the memory system 100 again. In the present embodiment, for example, the memory system 100 is once removed from the SD® card slot of the host 200, and then the memory system 100 is inserted again into the SD® card slot of the host 200. As a result, the firmware of the memory system 100 is rebooted. Then, the host 200 may correctly recognize the operation mode of a first non-volatile memory 50.

As described above, the initialization operation of the memory system 100 is completed. Although S250 and S260 are performed in order to prevent alteration by the user, in some embodiments, the process may proceed from S240 to S270 without performing S250 and S260.

Figure 6:
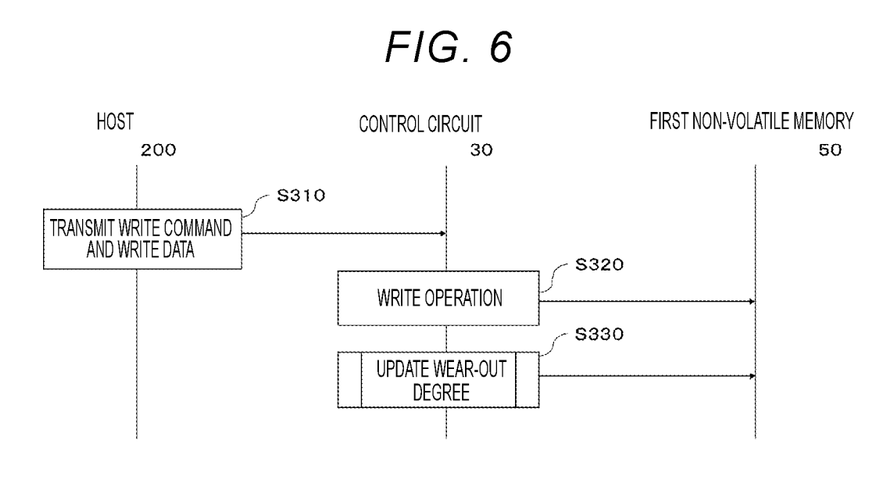
FIG. 6 is a sequence diagram of a write operation according to the first embodiment.
Figure 7:
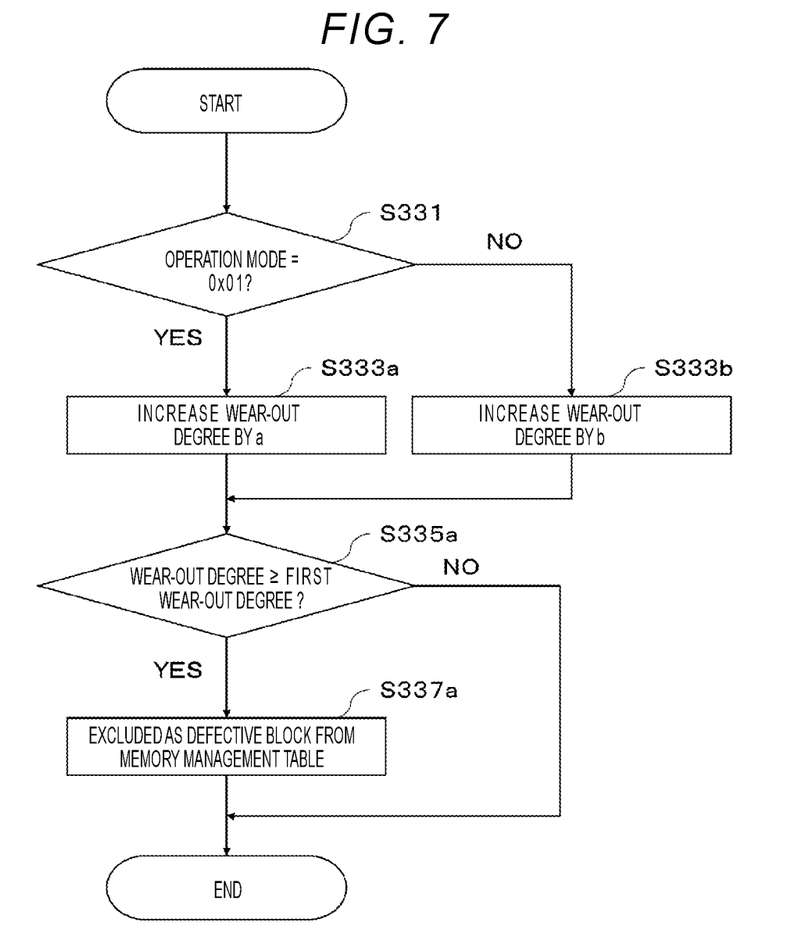
FIG. 7 is a flowchart of a wear-out degree update operation according to the first embodiment.
Figure 8:
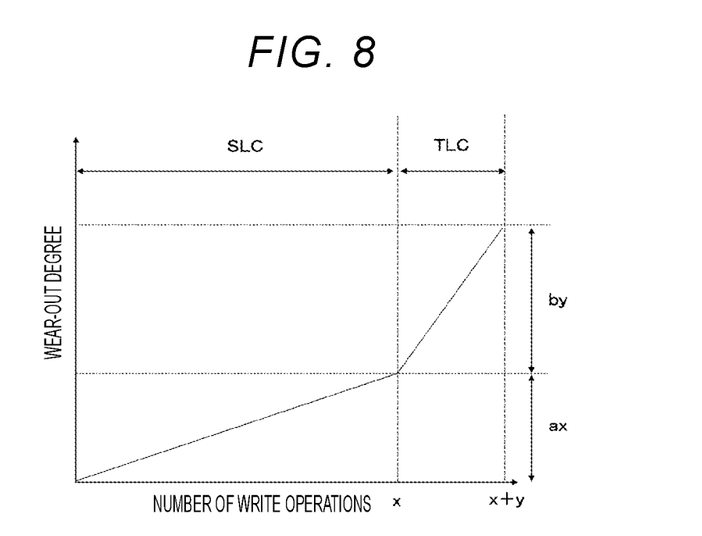
FIG. 8 is a graph illustrating a relationship between the number of write operations and the wear-out degree according to the first embodiment.

With reference to FIGS. 6 to 8, descriptions will be made on a write operation and an operation of updating a wear-out degree accompanying the write operation.

FIG. 6 is a sequence diagram of a write operation according to the first embodiment.

First, the host 200 transmits a write command and write data to the memory system 100 (S310). The control circuit 30 performs a write operation to the first non-volatile memory 50 in response to receiving the write command and the write data (S320). Subsequently, the control circuit 30 updates the wear-out degree of the block written in S320 (S330).

FIG. 7 is a flowchart of a wear-out degree update operation according to the first embodiment. S330 of FIG. 6 will be described in detail with reference to FIG. 7.

After S320, the control circuit 30 confirms whether the operation mode stored in the first non-volatile memory 50 is 0x01 (S331). When it is confirmed that the operation mode stored in the first non-volatile memory 50 is 0x01 ("YES" in S331), that is, the operation mode is in the SLC mode, the control circuit 30 increases the wear-out degree of the written block by a (a is a natural number) (S333a). Meanwhile, when it is confirmed that the operation mode stored in the first non-volatile memory 50 is 0x00 ("NO" in S331), that is, the operation mode is in the TLC mode, the control circuit 30 increases the wear-out degree of the written block by b (b is a natural number, a<b) (S333b). In the present embodiment, the symbol "a" is an example of a first coefficient. The symbol "b" is an example of a second coefficient.

When the wear-out degree of the written block is increased according to the operation mode, the control circuit 30 confirms whether the wear-out degree of the written block is equal to or greater than the first wear-out degree (S335a). When it is confirmed that the wear-out degree of the written block is smaller than the first wear-out degree ("NO" in S335a), the write operation and the wear-out degree update operation are completed.

Meanwhile, when it is confirmed that the wear-out degree of the written block is equal to or greater than the first wear-out degree ("YES" in S335), the control circuit updates the memory management table. Specifically, the control circuit 30 excludes the written block as a defective block from the memory management table (S337a).

As described above, the write operation and the wear-out degree update operation are completed.

FIG. 8 is a graph illustrating a relationship between the number of write operations and the wear-out degree according to the first embodiment. The vertical axis represents the wear-out degree of the block, and the horizontal axis represents the number of write operations.

When the write operation of S320 is performed in the memory system 100 initialized in the SLC mode, the wear-out degree of the written block is increased by a in S330. That is, when one block is written x (x is a natural number) times in the SLC mode, the wear-out degree of the written block is increased by ax.

When the write operation of S320 is performed in the memory system 100 initialized in the TLC mode, the wear-out degree of the written block is increased by b in S330. That is, when one block is written y (y is a natural number) times in the TLC mode, the wear-out degree of the written block is increased by by. Since the operation mode in which the number of bits that may be stored in one storage element is relatively large is more likely to be worn out than the operation mode in which the number of bits that may be stored in one storage element is relatively small, the TLC mode is more likely to be worn out than the SLC mode.

In the present embodiment, by increasing the wear-out degree by a or b according to the operation mode, it is possible to collectively manage the wear-out degree in any operation mode, as illustrated in FIG. 8.

(Effect)

Figure 9:
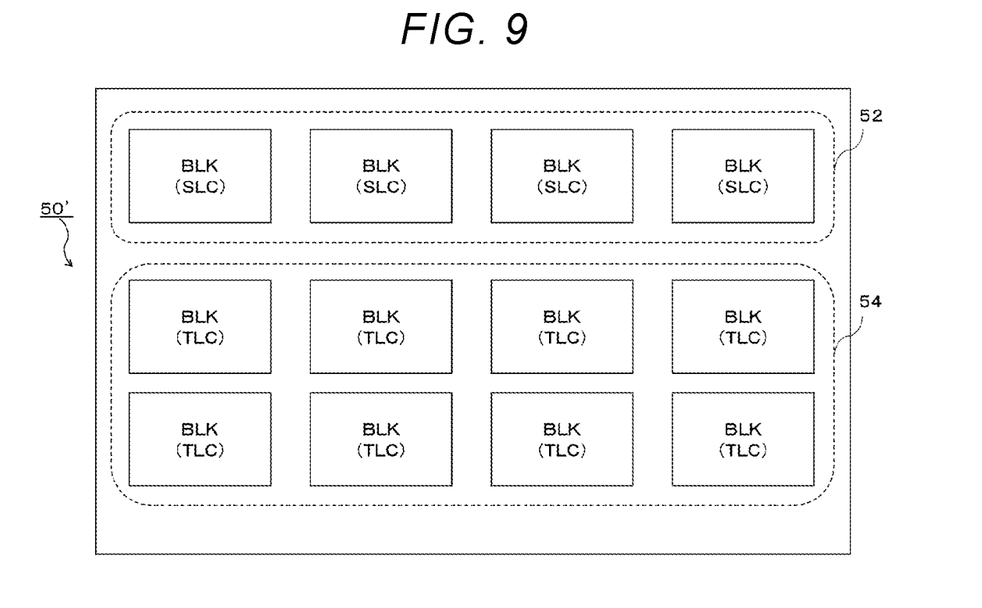
FIG. 9 is a block diagram illustrating an example of the configuration of a first non-volatile memory according to a comparative example.

FIG. 9 is a block diagram illustrating an example of the configuration of a first non-volatile memory according to a comparative example.

As illustrated in FIG. 9, the block of a first non-volatile memory 50' according to the comparative example is divided into a block 52 operating in the SLC mode and a block 54 operating in the TLC mode. Therefore, the block 54 operating in the TLC mode is more likely to be worn out and has a lower durability as compared with the block 52 operating in the SLC mode. Further, in order to manage the wear-out degree, it is necessary to separately prepare a wear-out information table targeting the block 52 operating in the SLC mode and a wear-out information table targeting the block 54 operating in the TLC mode. Therefore, in the first non-volatile memory 50', a capacity for storing a plurality of wear-out information tables is required. In addition, it is necessary to manage the wear-out degree by a method corresponding to each operation mode. That is, the control method of the memory system 100 is complicated.

According to the present embodiment, either the SLC mode or the TLC mode is applied to all blocks of the first non-volatile memory 50. Then, it is possible to switch to either the SLC mode or the TLC mode. Therefore, it is considered that all blocks are worn out to the same extent. Therefore, the durability of the memory system 100 is increased. Further, since the operation mode may be switched in all blocks, the wear-out information may be managed by one wear-out information table. Therefore, in the first non-volatile memory 50, the storage capacity of the wear-out information table may be reduced. Further, since it is possible to collectively manage the wear-out degree in any of the operation modes, it becomes easier to control the memory system 100. By setting the operation mode in the external device 300, the operation mode may be switched mainly by the memory system 100. Further, it is possible to improve the reliability of the memory system 100 by not performing an operation on the block having a wear-out degree equal to or greater the first wear-out degree.

Second Embodiment

A memory system 100 according to a second embodiment of the present disclosure will be described with reference to FIGS. 10 and 11. The difference from the first embodiment is the wear-out degree update operation. Hereinafter, only the points different from the first embodiment will be described.

The memory management table may further store a block that may operate among a plurality of blocks as a block that may operate in the SLC mode or a block that may operate in the SLC mode and the TLC mode. In the shipped state, all blocks that may operate among the plurality of blocks are stored as blocks that may operate in the SLC mode and the TLC mode.

(Operation)

Figure 10:
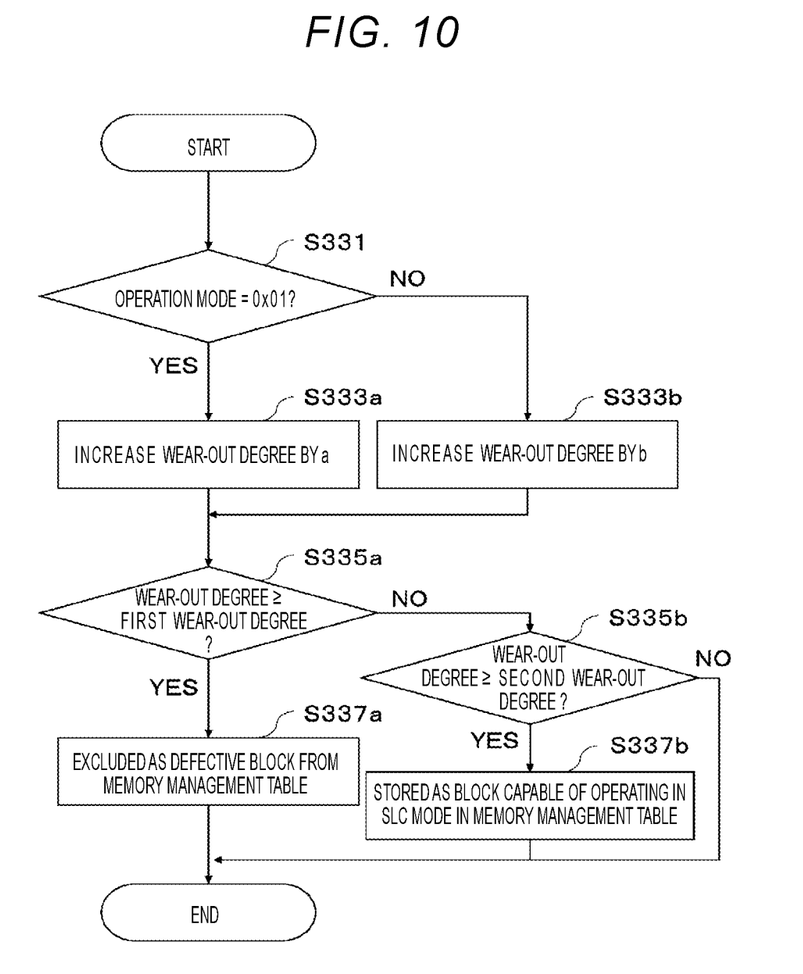
FIG. 10 is a flowchart of a wear-out degree update operation according to a second embodiment.

FIG. 10 is a flowchart of a wear-out degree update operation according to the second embodiment. Since the write operation according to the second embodiment is the same as that in FIG. 6, the operation is not described. S330 of FIG. 6 will be described in detail with reference to FIG. 10. Since S333a and S333b are the same as those in FIG. 7, the steps are not described.

When the wear-out degree of the written block is increased according to the operation mode, the control circuit 30 confirms whether the wear-out degree of the written block is equal to or greater than the first wear-out degree (S335a).

When it is confirmed that the wear-out degree of the written block is equal to or greater than the first wear-out degree ("YES" in S335a), the control circuit 30 updates the memory management table. Specifically, the control circuit 30 excludes the written block as a defective block from the memory management table (S337a).

Meanwhile, when it is confirmed that the wear-out degree of the written block is smaller than the first wear-out degree ("NO" in S335a), the control circuit 30 confirms whether the wear-out degree of the written block is equal to or greater than a second wear-out degree (S335*b*).

When it is confirmed that the wear-out degree of the written block is smaller than the second wear-out degree ("NO" in S335*b*), the write operation and the wear-out degree update operation are completed.

Meanwhile, when it is confirmed that the wear-out degree of the written block is equal to or greater than the second wear-out degree ("YES" in S335*b*), the control circuit 30 updates the memory management table. Specifically, the control circuit 30 stores the written block in the memory management table as a block that may operate in the SLC mode (S337*b*).

As described above, the write operation and the wear-out degree update operation are completed.

Figure 11:
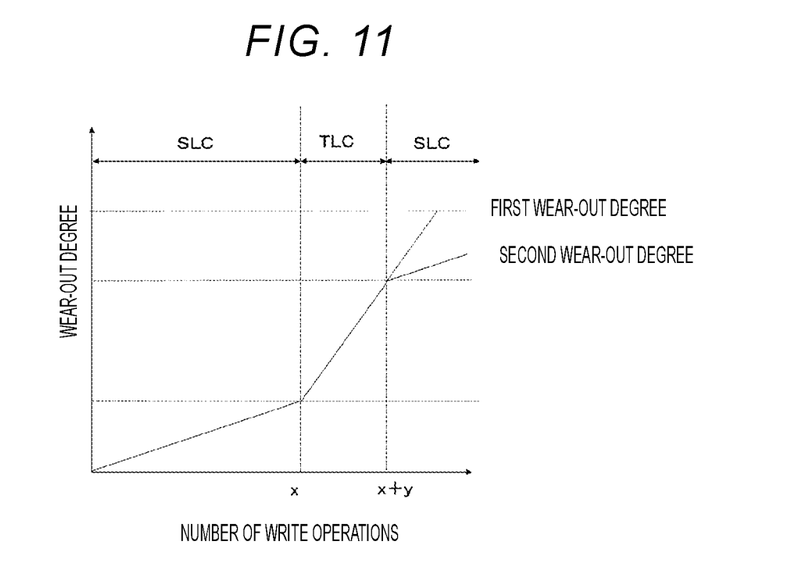
FIG. 11 is a graph illustrating a relationship between the number of write operations and the wear-out degree according to the second embodiment.

FIG. 11 is a graph illustrating a relationship between the number of write operations and the wear-out degree according to the second embodiment. The broken line represents the wear-out degree when the wear-out degree of the written block is equal to or greater than the second wear-out degree ("YES" in S335*b*) and the operation is continued in the TLC mode, and the solid line represents the wear-out degree when the wear-out degree of the written block is equal to or greater than the second wear-out degree ("YES" in S335*b*) and the operation is continued in the SLC mode. As illustrated in FIG. 11, when the wear-out degree is equal to or greater than the second wear-out degree, it is possible to reduce the wear-out degree by operating in the SLC mode, so that the written block is less likely to be worn out.
(Effect)

According to the present embodiment, the same effect as that of the first embodiment may be obtained. Further, when the wear-out degree of the block is equal to or greater than the second wear-out degree, it is possible to further improve the durability of the block as compared with the first embodiment by performing the operation only in the operation mode, so that the written block is less likely to be worn out.

Third Embodiment

A memory system 100 according to a third embodiment of the present disclosure will be described with reference to FIGS. 12 and 13. The difference from the first embodiment is the configuration of the memory system 100. Hereinafter, only the points different from the first embodiment will be described.
(Configuration)

Figure 12:
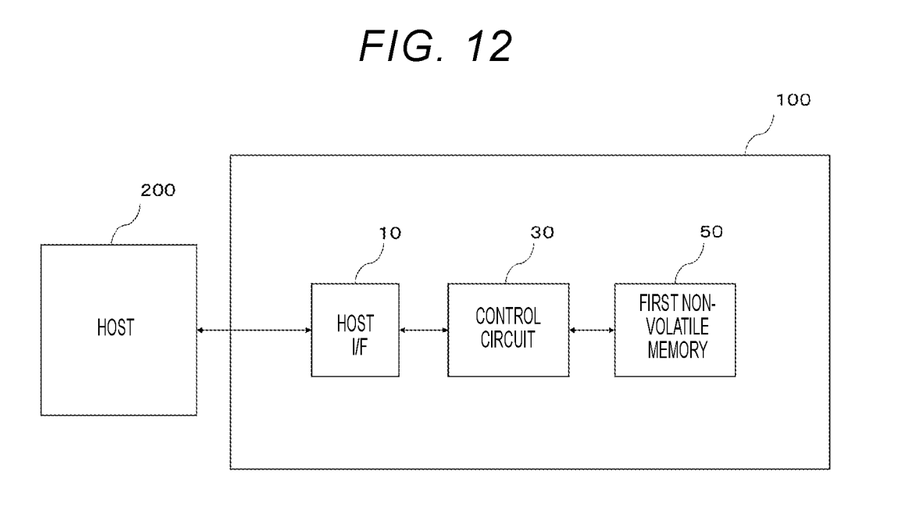
FIG. 12 is a block diagram illustrating an example of the configuration of a memory system according to a third embodiment.

FIG. 12 is a block diagram illustrating an example of the configuration of a memory system according to the third embodiment. As illustrated in FIG. 12, the memory system 100 includes a host I/F 10, a control circuit 30, and a first non-volatile memory 50.

The first non-volatile memory 50 stores, for example, control software and firmware of the memory system 100, a memory management table, a wear-out information table, and an operation mode as system data. The operation mode stored as system data is the operation mode stored as operation switching information in the second non-volatile memory 90 in the first embodiment. In the present embodiment, the operation mode is received from the host 200.
(Operation)

Figure 13:
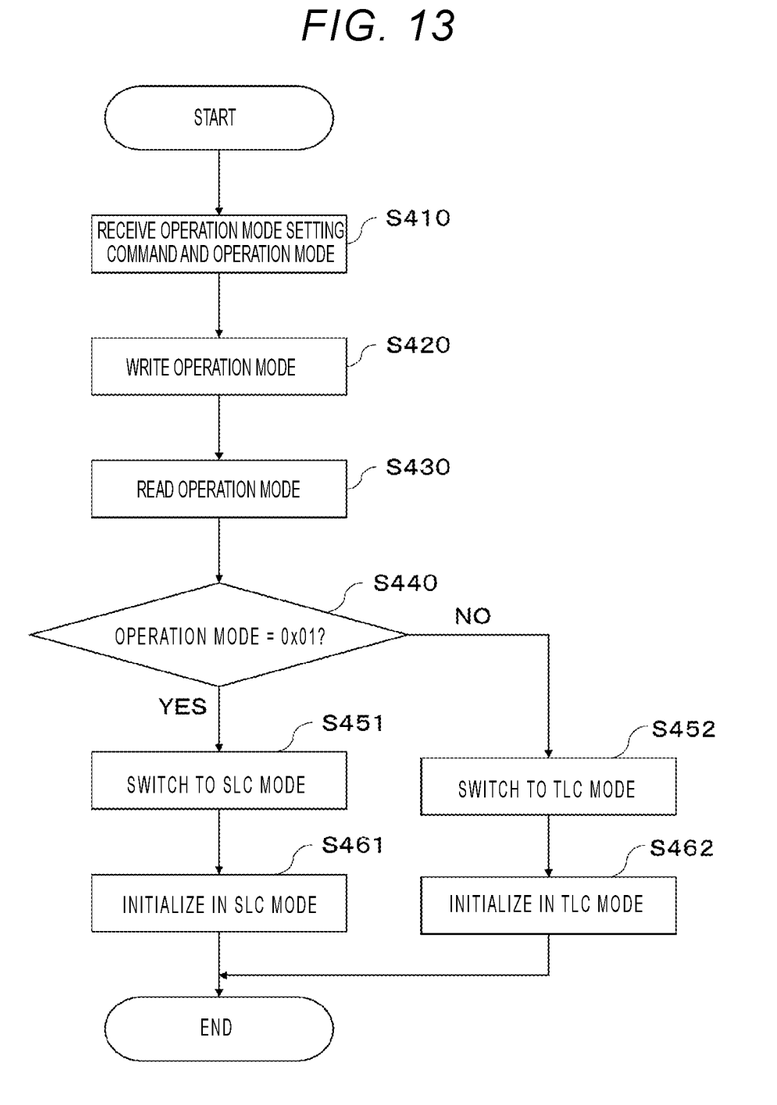
FIG. 13 is a flowchart of an initialization operation of the memory system according to the third embodiment.

FIG. 13 is a flowchart of an initialization operation of the memory system according to the third embodiment.

First, the memory system 100 is connected to the host 200. In the present embodiment, an SD® card, which is an example of the memory system 100, is connected by inserting the SD® card into the SD® card slot of the host 200. The memory system 100 receives an operation mode setting command and an operation mode from the host 200 to the memory system 100 (S410). The operation mode setting command is a command for setting the operation mode of the first non-volatile memory 50.

The control circuit 30 writes the operation mode as system data in the first non-volatile memory 50 in response to receiving the operation mode setting command and the operation mode (S420). When the writing of the operation mode into the first non-volatile memory 50 is completed, the connection between the memory system 100 and the host 200 is disconnected, and the power supply to the memory system 100 is stopped. In the present embodiment, for example, the SD®™ card, which is an example of the memory system 100, is removed from the SD®™ card slot of the host 200.

The memory system 100 is connected to the host 200 again. As a result, power is supplied to the memory system 100 again. When the power is supplied to the memory system 100 again, the control circuit 30 reads out the operation mode stored in the non-volatile memory 50 in S420 (S430).

The control circuit 30 confirms whether the operation mode read in S430 is 0x01 (S440).

When it is confirmed that the operation mode read in S430 is 0x01 ("YES" in S440), the control circuit 30 switches the first non-volatile memory 50 to the SLC mode (S451). Then, the control circuit 30 performs the initialization operation of the first non-volatile memory 50 in the SLC mode (S461).

When it is confirmed that the operation mode read in S430 is not 0x01 ("NO" in S440), that is, when the operation mode read in S430 is 0x00, the control circuit 30 switches the first non-volatile memory 50 to the TLC mode (S452). Then, the control circuit 30 performs the initialization operation of the first non-volatile memory 50 in the TLC mode (S462).

In the present embodiment, in order to switch the operation mode of the first non-volatile memory 50 according to the command from the host 200, the initialization operation of the first non-volatile memory 50 is performed after the operation mode is switched. This completes the initialization operation of the memory system 100.
(Effect)

According to the present embodiment, the same effect as that of the first embodiment may be obtained. Further, by setting the operation mode on the host 200, the operation mode may be switched mainly by the host 200.
(Modifications)

In the above-described embodiments, the control circuit 30 is a CPU, but may be a memory controller. In the case of a memory controller, the host I/F 10 may be provided in the memory controller.

The first non-volatile memory 50 is not limited to a NAND-type flash memory, and may be a NOR-type flash memory, a magneto-resistive random access memory (MRAM), a phase change random access memory((PRAM), a resistive random access memory (ReRAM), and a ferroelectric random access memory (FeRAM).

The second non-volatile memory 90 is not limited to the EEPROM, and may be any non-volatile memory that may be operated by the external device 300 via the wireless communication device 70.

In FIG. 2, illustrations have been made on the case where the threshold voltage distributions do not overlap, but in reality, the threshold voltage distributions may vary due to various factors to overlap each other. Further, the number of bits stored in one storage element is an example and is not limited thereto. For example, data of 4 bits or more may be stored in the storage element.

In FIG. 3, it is illustrated that the operation mode switching information is stored in the addresses 0x0000 and 0x0001 of the second non-volatile memory 90. However, the operation mode switching information may be stored, and the stored address is not limited thereto.

In the initialization operation of the memory system 100, a part of the system data of the memory system 100 may be erased.

Although the operation mode of all blocks of the first non-volatile memory is switched, the operation mode of certain blocks may be fixed. For example, the block in which the system data is stored operates in the SLC mode, and the operation mode of the block in which the user data is stored switches between the SLC mode and the TLC mode. Further, the block in which the system data is stored may operate in the TLC mode, and the operation mode of the block in which the user data is stored may switch between the SLC mode and the TLC mode.

Although the wear-out degree is related to the number of write operations and the operation mode, other factors such as the number of erase operations may be considered.

When the control circuit 30 has already acquired the operation mode in the wear-out degree update operation, S331 may be omitted and the process may proceed to S333a or S333b.

There are two operation modes of the SLC mode and the TLC mode, but the SLC mode and the MLC mode may be used. For example, the operation mode may be three, that is, the SLC mode, the MLC mode, and the TLC mode. In this case, the MLC mode is an example of a third operation mode.

Figure 14:
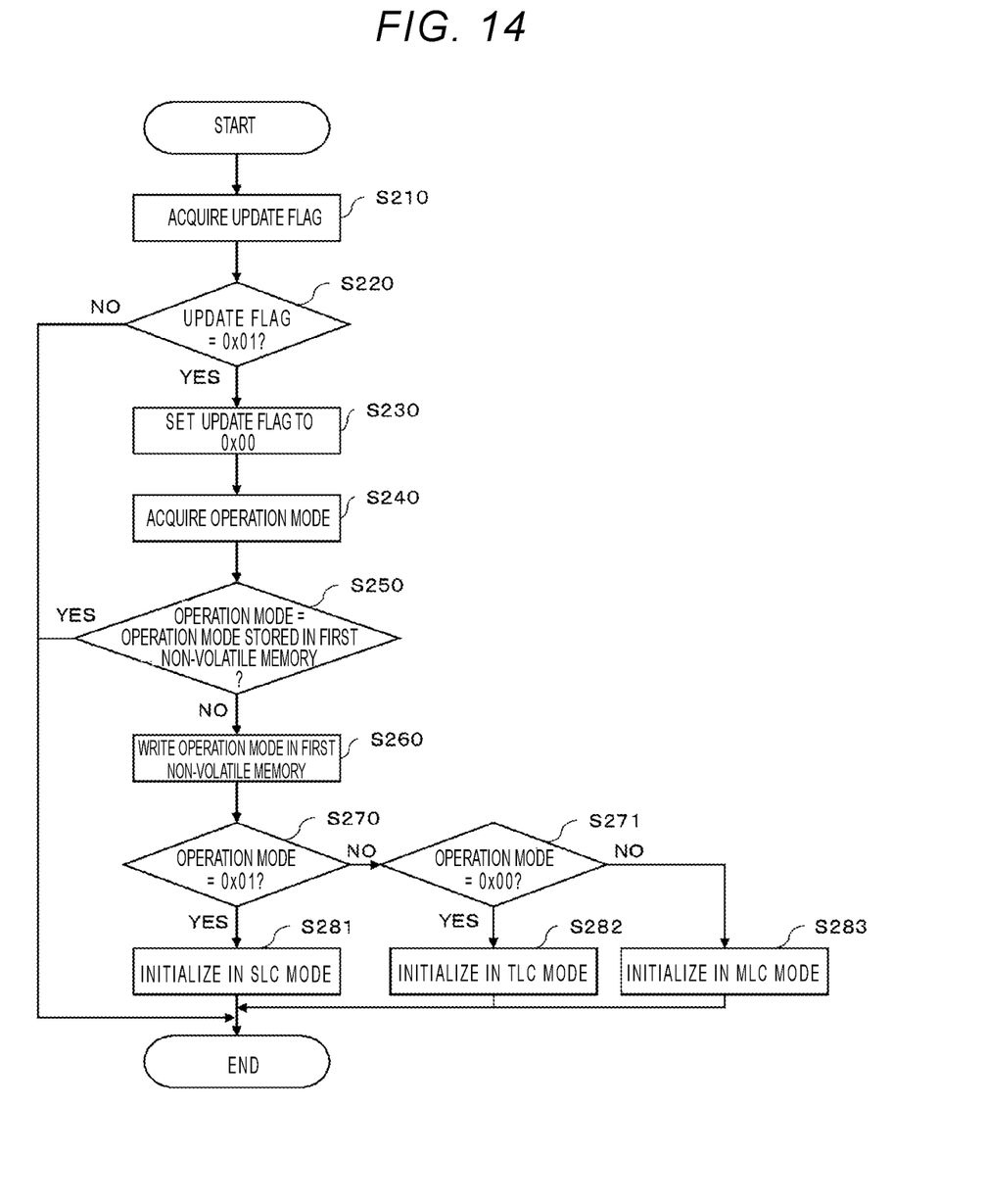
FIG. 14 is a flowchart of an initialization operation of a memory system according to a modification.

FIG. 14 is a flowchart of the initialization operation of a memory system according to a modification. When the operation mode stored in the address 0x0000 of the second non-volatile memory 90 is, for example, 0x02 in the three operation modes of the SLC mode, the MLC mode, and the TLC mode, the memory system 100 is initialized in the MLC mode. Specifically, when the data of the start-up mode written in S260 is neither 0x01 ("NO" in S270) nor 0x00 ("NO" in S271), the control circuit 30 performs the initialization operation of the memory system 100 in the MLC mode (S283). 0x02 stored in the address 0x0000 of the second non-volatile memory 90 is an example of a fifth value.

When one of three operation modes of the SLC mode, the MLC mode, and the TLC mode may be set, the memory management table may store a block capable of operating among a plurality of blocks as a block capable of operating in the SLC mode, a block capable of operating in the SLC mode and the MLC mode, or a block capable of operating in the SLC mode, the MLC mode, and the TLC mode. In the shipped state, all blocks capable of operating among the plurality of blocks are stored as blocks capable of operating in the SLC mode, the MLC mode, and the TLC mode.

Figure 15:
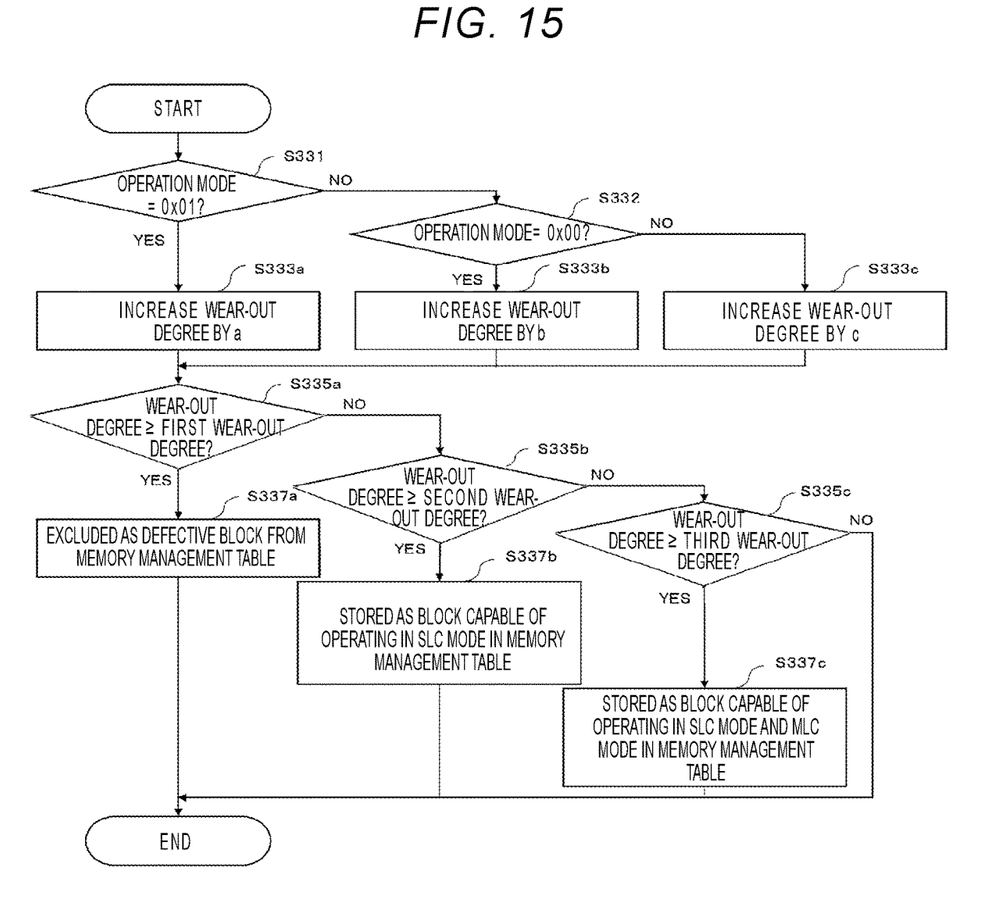
FIG. 15 is a flowchart of a wear-out degree update operation according to the modification.

FIG. 15 is a flowchart of the wear-out degree update operation according to the modification. When the wear-out degree is written in the MLC mode, the control circuit 30 may increase the wear-out degree of the written block according to the MLC mode. Specifically, when the operation mode stored in the first non-volatile memory 50 is neither 0x01 ("NO" in S331) nor 0x00 ("NO" in S332), the control circuit 30 increases the wear-out degree of the written block by c (c is a natural number, a<<<b) (S333c). In the present embodiment, the symbol "c" is an example of a third coefficient.

Further, when the wear-out degree of the written block is smaller than the second wear-out degree ("NO" in S335b), the control circuit 30 may confirm whether the wear-out degree of the written block is equal to or greater than a third wear-out degree by using the third wear-out degree smaller than the second wear-out degree (S335c). When it is confirmed that the wear-out degree of the written block is equal to or greater than the third wear-out degree ("YES" in S335c), the control circuit 30 updates the memory management table. Specifically, the control circuit 30 stores the written block in the memory management table as a block capable of operating in the SLC mode and the MLC mode (S337c). As described above, the control of the operation mode may be divided into four stages.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system comprising:
   a first non-volatile memory that operates in one of a plurality of operation modes including at least a first operation mode and a second operation mode; and
   a control circuit configured to switch the operation mode of the first non-volatile memory based on an operation mode switching information received from an external device, wherein:
   the first non-volatile memory includes a plurality of blocks and a wear-out information table in which a wear-out degree of each of the plurality of blocks is stored;
   the control circuit updates the wear-out degree of a block on which a write is performed and stores the updated wear-out degree of the block in the wear-out information table;
   when the write is performed in the first operation mode, the control circuit increases the wear-out degree of the block on which the write is performed by a first coefficient; and
   when the write is performed in the second operation mode, the control circuit increases the wear-out degree of the block on which the write is performed by a second coefficient greater than the first coefficient.

2. The memory system according to claim 1, further comprising:
   a wireless communication device configured to receive the operation mode switching information from the external device.

3. The memory system according to claim 2, wherein the wireless communication device operates according to a near field communication standard or a wireless local area network (LAN)-related standard.

4. The memory system according to claim 1, wherein the operation mode switching information includes an update flag and one of the plurality of operation modes.

5. The memory system according to claim 4, wherein
when the update flag is a first value, the control circuit performs an initialization operation of the first non-volatile memory, and
when the update flag is a second value, the control circuit does not perform the initialization operation of the first non-volatile memory.

6. The memory system according to claim 5, wherein
when the update flag is the first value and the operation mode is a third value, the control circuit performs the initialization operation of the first non-volatile memory in the first operation mode, and
when the update flag is the first value and the operation mode is a fourth value, the control circuit performs the initialization operation of the first non-volatile memory in the second operation mode.

7. The memory system according to claim 1, wherein
the first non-volatile memory further includes a memory management table that stores IDs of blocks capable of performing an operation, and
the control circuit excludes from the memory management table IDs of blocks having a wear-out degree equal to or greater than a first wear-out degree.

8. The memory system according to claim 7, wherein
IDs of blocks capable of operating in only the first operation mode or blocks capable of operating in any one of the plurality of operation modes are stored in the memory management table, and
the control circuit stores an ID of a block having the wear-out degree smaller than the first wear-out degree and equal to or greater than a second wear-out degree in the memory management table as a block capable of operating in only the first operation mode.

9. The memory system according to claim 1,
wherein the first non-volatile memory includes a plurality of blocks each including a plurality of storage elements,
wherein the first operation mode stores n (n is a natural number) bits of data in each of the plurality of storage elements, and
wherein the second operation mode stores m (m is a natural number, n<m) bits of data in each of the plurality of storage elements.

10. The memory system according to claim 9,
wherein the plurality of operation modes further include a third operation mode that stores l (l is a natural number, n<l<m) bits of data in each of the plurality of storage elements,
wherein the operation mode switching information includes an update flag and any one of the first operation mode, the second operation mode, and the third operation mode,
wherein when the update flag is a first value,
in case of the operation mode being a third value, the control circuit performs an initialization operation of the first non-volatile memory in the first operation mode,
in case of the operation mode being a fourth value, the control circuit performs the initialization operation of the first non-volatile memory in the second operation mode, and
in case of the operation mode being a fifth value, the control circuit performs the initialization operation of the first non-volatile memory in the third operation mode, and wherein when the update flag is a second value, the control circuit does not perform the initialization operation of the first non-volatile memory.

11. The memory system according to claim 10, wherein
when the write is performed in the third operation mode, the control circuit increases the wear-out degree of the block on which the write is performed by a third coefficient greater than the first coefficient and smaller than the second coefficient.

12. The memory system according to claim 10,
wherein the first non-volatile memory further includes a memory management table that stores IDs of blocks capable of performing an operation,
wherein the memory management table stores IDs of blocks capable of operating only in the first operation mode, IDs of blocks capable of operating in either the first operation mode or the third operation mode but not the second operation mode, or IDs of blocks capable of operating in any one of the first operation mode, the second operation mode, and the third operation mode, and
wherein the control circuit
excludes from the memory management table IDs of blocks having a wear-out degree equal to or greater than a first wear-out degree,
stores IDs of blocks having the wear-out degree smaller than the first wear-out degree and equal to or greater than a second wear-out degree in the memory management table as a block capable of operating only in the first operation mode, and
stores IDs of blocks having the wear-out degree smaller than the second wear-out degree and equal to or greater than a third wear-out degree in the memory management table as a block capable of operating in either the first operation mode or the third operation mode but not in the second operation mode.

13. The memory system according to claim 1, wherein an operation includes a write operation, a read operation, or an erase operation.

14. A method of operating a memory system including a first non-volatile memory that operates in any one of a plurality of operation modes including at least a first operation mode and a second operation mode, the method comprising:
receiving operation mode switching information from an external device; and
switching the operation mode of the first non-volatile memory based on the operation mode switching information, wherein:
the first non-volatile memory includes a plurality of blocks and a wear-out information table in which a wear-out degree of each of the plurality of blocks is stored;
when a write is performed in the first operation mode, the memory system increases the wear-out degree of the block on which the write is performed by a first coefficient; and
when the write is performed in the second operation mode, the memory system increases the wear-out degree of the block on which the write is performed by a second coefficient greater than the first coefficient.

15. The method according to claim 14, wherein the memory system further includes a wireless communication device that receives the operation mode switching information from the external device.

16. The method according to claim 14, wherein the operation mode switching information includes an update flag and any one of the plurality of operation modes, and wherein when the update flag is a first value, in case of the operation mode being a third value, the control circuit performs an initialization operation of the first non-volatile memory in the first operation mode, and in case of the operation mode being a fourth value, the control circuit performs the initialization operation of the first non-volatile memory in the second operation mode, and when the update flag is a second value, the control circuit does not perform the initialization operation of the first non-volatile memory.

17. The method according to claim 14, wherein the first non-volatile memory further includes a memory management table that stores IDs of blocks capable of performing an operation, wherein the memory management table stores IDs of blocks capable of operating only in the first operation mode or in any one of the plurality of operation modes, and wherein the memory system excludes IDs of blocks having the wear-out degree equal to or greater than a first wear-out degree from the memory management table, and the memory system stores IDs of blocks having the wear-out degree smaller than the first wear-out degree and equal to or greater than a second wear-out degree in the memory management table as a block capable of operating only in the first operation mode.

* * * * *